United States Patent [19]
Lorenz et al.

[11] Patent Number: 5,646,852
[45] Date of Patent: Jul. 8, 1997

[54] METHOD AND DEVICE FOR VEHICLE FUEL CELL DYNAMIC POWER CONTROL

[75] Inventors: Helmut Lorenz, Unterensingen; Karl-Ernst Noreikat, Esslingen; Thomas Klaiber, Weinstadt; Wolfram Fleck, Erbach; Josef Sonntag, Illertissen; Gerald Hornburg, Elchingen; Andreas Gaulhofer, Salem, all of Germany

[73] Assignee: Daimler-Benz Aktiengesellschaft, Germany

[21] Appl. No.: 706,973

[22] Filed: Sep. 3, 1996

Related U.S. Application Data

[63] Continuation of Ser. No. 272,198, Jul. 8, 1994, abandoned.

[30] Foreign Application Priority Data

Jul. 8, 1993 [DE] Germany ............... 43 22 765.1

[51] Int. Cl.⁶ ...................................... H01M 8/18
[52] U.S. Cl. ............... 364/431.051; 429/13; 429/19; 364/424.026
[58] Field of Search ............. 364/431.05; 429/13, 429/15, 19, 20, 33

[56] References Cited

U.S. PATENT DOCUMENTS

| | | | |
|---|---|---|---|
| 4,147,839 | 4/1979 | Solomon et al. | 429/15 |
| 4,904,548 | 2/1990 | Tajima | 429/22 |
| 4,923,768 | 5/1990 | Kaneko et al. | 429/19 |
| 5,332,630 | 7/1994 | Hsu | 429/20 |
| 5,346,778 | 9/1994 | Ewan et al. | 429/19 |
| 5,399,443 | 3/1995 | Ong et al. | 429/33 |
| 5,401,589 | 3/1995 | Palmer et al. | 429/13 |
| 5,429,885 | 7/1995 | Stockburger et al. | 429/13 |

FOREIGN PATENT DOCUMENTS

| | | |
|---|---|---|
| 0 508 991 B1 | 8/1994 | European Pat. Off. . |
| 3-276573 | 12/1991 | Japan . |
| WO-A-93 070222 | 4/1993 | WIPO . |

OTHER PUBLICATIONS

Brennstoffzellen für Elektrotraktion, K. Strasser, Berichte NR 912, 1992, pp. 124–145.

System Analysis of an Integrated Methanol Steam Reformer/PEM Fuel Cell Power Generating System; J.C. Amphlett, R. M. Baumert, R. F. Mann and B.A. Peppley, pp. 3,342–3,349.

Patent Abstract of Japan, vol. 13, No. 594 (E–867) 27 Dec. 1989 & JP-A-01 248 474 (Hitachi, Ltd.) 4 Oct. 1989.

"The GM High-Performance Induction Motor Drive System", Paul D. Agarwal, IEEE Transactons on Power Apparatus and Systems, vol. PAS-88, No. 2, Feb. 1969, pp. 86–93.

European Search Report with English translation.

(List continued on next page.)

Primary Examiner—Kevin J. Teska
Assistant Examiner—Russell W. Frejd
Attorney, Agent, or Firm—Evenson, McKeown, Edwards & Lenahan, P.L.L.C.

[57] ABSTRACT

A method and an apparatus are provided for controlling the power of an electric drive unit in a vehicle. The drive unit is supplied with electrical energy by a fuel cell in the vehicle. On the basis of a power request which is determined from the accelerator pedal position, the air flow rate required to provide the set power from the fuel cell is calculated and set by controlling rotational speed of a compressor arranged in the air intake line to the fuel cell. To prevent the fuel cell from producing more electrical power than the drive unit can absorb, the drive unit acts limits the power request by emitting appropriate error messages. The set value for the power is fed to the drive unit and can be corrected such that the drive unit never demands more power than the amount of power instantaneously produced by the fuel cell to prevent fuel cell collapse.

12 Claims, 1 Drawing Sheet

OTHER PUBLICATIONS

LaserCell Prototype Vehicle, R. E. Billings, M. Sanchez and D. B. Eyre, American Academy of Science, 7 Oct. 1991, pp. 829–837.

Solid Polymer Fuel Cell Developments at Ballard, Keith B. Prater, Journal of Power Sources, 37 (1992) 181–188.

The Design of a 3,000 Mile Range Transit Bus Powered by Hydrogen Fuel Cells, Karl S. Young, Yung Technologies International, Inc., pp. 3.349–3.355.

The GM High–Performance Induction Motor Drive System, Paul D. Agarwal, IEEE Transactions on Power Apparatus and Systems, vol. PAS–88, No. 2, Feb. 1969, pp. 86–93.

METHOD AND DEVICE FOR VEHICLE FUEL CELL DYNAMIC POWER CONTROL

This application is a continuation of application Ser. No 08/272,198, filed on Jul. 8, 1994, now abandoned.

CROSS-REFERENCE TO RELATED APPLICATION

This application is related to application Ser. No. 08/272, 197 filed on Jul. 8, 1994 the name of Helmut LORENZ et al. for APPARATUS AND METHOD FOR STARTING A FUEL CELL VEHICLE.

BACKGROUND AND SUMMARY OF THE INVENTION

The present invention relates to a method and an apparatus for dynamic power control for a vehicle with a fuel cell which supplies electrical energy to the vehicle.

An article by P. Agarwal in IEEE Transactions on Power Apparatus and Systems, 88 (1969) 2, pp. 88–93, proposes a vehicle which is driven by an electric motor supplied with electrical energy via fuel cells. In order to control the power of the electric motor, and thus of the vehicle, it is suggested to transform the fixed voltage supplied by the fuel cell with the aid of a voltage transformer as a function of the power request. The disadvantage with this system is the low efficiency in the partial-load range.

Therefore, an object of the invention is to provide a method and an apparatus in which the power of a vehicle with a fuel cell can be controlled dynamically and with optimum utilization of the electrical energy produced.

The foregoing object has been achieved in accordance with the present invention by providing that the maximum electrical power made available by the fuel cell is fed to the electrical drive unit, and the power is set by controlling the oxidant flow rate, i.e. air intake flow rate.

By virtue of the control of the vehicle power by way of the rate of oxidant flow, it is ensured that the entire electrical energy made available by the fuel cell is supplied to the drive unit under all operating conditions, and the energy used is thus utilized to an optimum degree. For this purpose, it is within the scope of the present invention that the prescribed set value for the power is to be limited as a function of operating parameters. As a result, the fuel cell is prevented from producing more electrical energy than the drive unit can instantaneously absorb because of, for example, overloading. In order to prevent the drive unit requiring more electrical energy than the fuel cell is instantaneously supplying, it is, of course, also necessary for the set value which is transmitted to the drive unit by the driver to be corrected or limited. The arrangement of a compressor with an adjustable rotational speed in the oxidant intake line constitutes one simple and advantageous way of controlling the oxidant flow rate.

BRIEF DESCRIPTION OF THE DRAWINGS

These and other objects, features and advantages of the present invention will become more readily apparent from the following detailed description thereof when taken in conjunction with the accompanying drawings wherein.

DETAILED DESCRIPTION OF THE DRAWINGS

Figure 1:
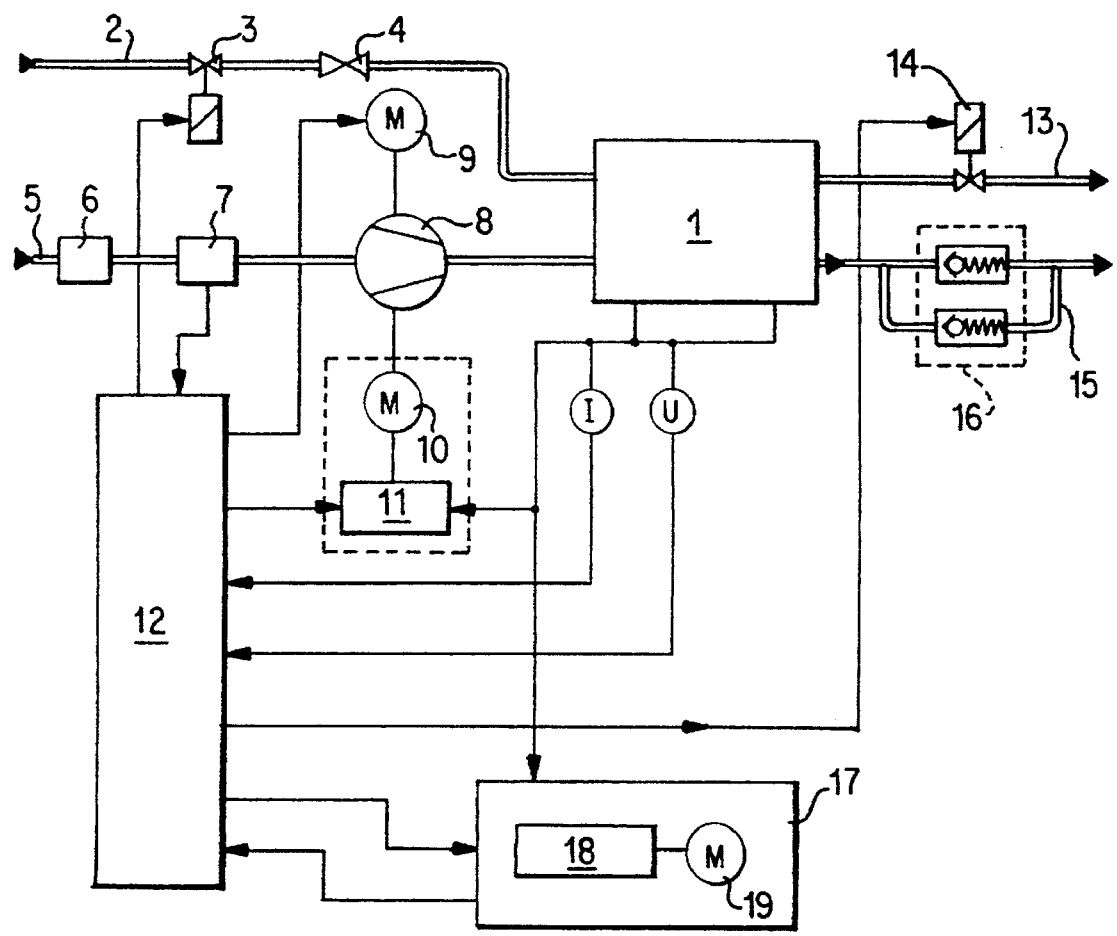
FIG. 1 is a schematic view of a fuel-cell system which is arranged in a vehicle in accordance with the present invention.

Referring now to FIG. 1, a fuel such as, for example, hydrogen gas, is fed to the fuel cell designated generally by numeral 1 via a first feed line 2 in which a valve 3 and a pressure controller 4 are arranged. In addition, an oxidant, e.g. oxygen or ambient air, is fed to the fuel cell 1 via a second feed line 5 in which an air filter 6, an air flow rate meter 7 and a compressor 8 are arranged. In the fuel cell 1, the fuel is oxidized at the anode and the oxidant is reduced at the cathode. In this electrochemical reaction, a voltage is produced between the two electrodes. By connecting many such cells in parallel or in series to form a so-called stack, voltages and currents can be obtained which are large enough to drive a vehicle.

A starter motor 9 and an electric motor 10 are provided to drive the compressor 8. In order to start the fuel cell 1, the starter motor 9 is supplied with current by a conventional 12v starter battery (not illustrated). During normal operation, the electrical energy required to operate the electric motor 10 is then supplied by the fuel cell 1 itself. With the aid of a current controller 11 which is driven by a control unit 12, the rotational speed $\underline{n}$ of the electric motor 10, and thus also of the compressor 8, can be controlled. The oxidant flow rate $\dot{m}_{act}$, and thus the power $p_{BZ}$ of the fuel cell 1 can be influenced via the rotational speed n of the compressor 8.

The air is conducted away from the fuel cell 1 via a first outflow line 15. Arranged in this first outflow line 15 is a pressure control valve 16 to aid in maintaining a constant operating pressure $\underline{p}$ in the fuel cell 1. In order to remove possible deposits or impurities of the hydrogen gas from the fuel cell 1, there is provided a second outflow line 13 in which is arranged a so-called purge valve 14. In order to drive the vehicle, a drive unit 17, consisting of a second current controller 18 and an electric motor 19, is provided.

The control unit 12 receives, via electrical lines, information on the instantaneous actual value $\dot{m}_{act}$ act of the air flow rate, the operating state of the drive unit 17, the voltage U produced by the fuel cell 1 and the corresponding current I. This information is processed in the control unit 12 and is used to generate control signals for the current controllers 11 and 18, the valves 3 and 14 and the starter motor 9. These control signals are, in turn, transmitted to the individual components via appropriate lines.

Figure 2:
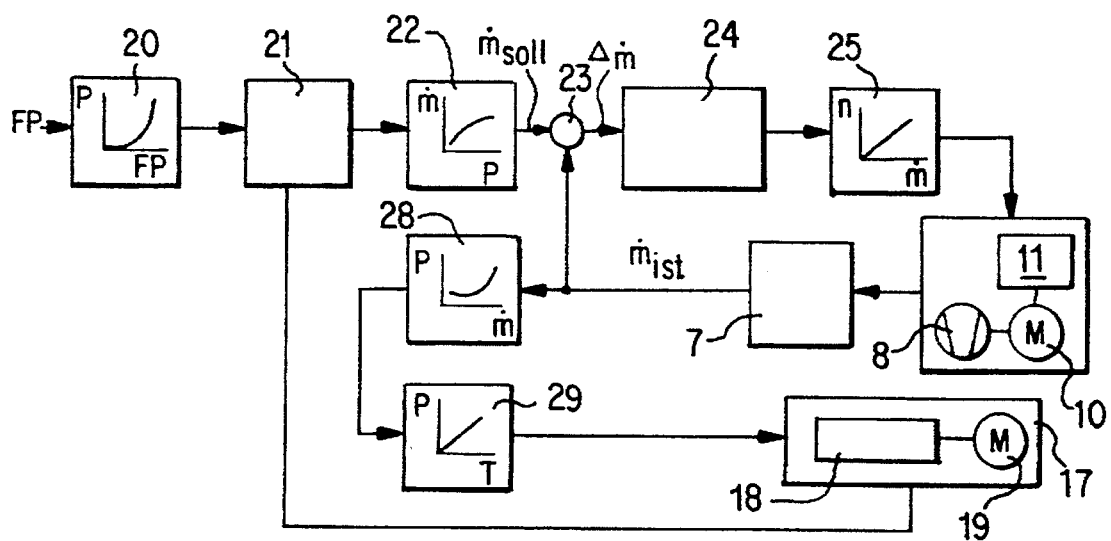
FIG. 2 is a diagram in block form of a method according to the present invention for power control of a vehicle fuel cell.

A method for dynamic power control for fuel cells in vehicles is described below with reference to FIG. 2. First, the power of the fuel cell 1 is controlled via a control of the air flow rate $\dot{m}_{act}$. Second, the maximum electrical power $p_{max}$ which can be removed from the fuel cell 1 for the drive unit 17 is calculated from the accelerator pedal position FP via which the driver can request the required power. The power $p_{max}$ is a product here of the difference between the power $p_{BZ}$ produced instantaneously by the fuel cell 1 and the power $p_{ZA}$ required for the auxiliary assemblies.

In block 20, the power $p_{set}$ requested by the driver is determined from the accelerator pedal position FP via a characteristic curve diagram. In order to prevent the fuel cell 1 from producing more electrical power $p_{BZ}$ than the drive unit 17 can instantaneously absorb, the set value $p_{set}$ for the power is limited in block 21 given the presence of appropriate error messages from the drive unit 17. Subsequently, in block 22, a set value for the required air flow rate $\dot{m}_{set}$ is determined from the set value $p_{set}$ for the power with reference to a further characteristic curve diagram. At the comparison point 23, the set value for the air flow rate $\dot{m}_{set}$ is then compared with the associated actual value $\dot{m}_{act}$ which is measured with the aid of a hot-wire air flow rate meter 7. The comparison result is fed to a PI controller 24 by way of which the difference $\Delta\dot{m}$ between the set value $\dot{m}_{set}$ and the actual value $\dot{m}_{act}$ for the rate of air flow is controlled toward zero. The rotational speed $\underline{n}$ at which the compressor 8 supplies the appropriate air flow rate is then determined from the new value for the air flow rate in block 25 with reference to a further characteristic curve. This speed of revolution $\underline{n}$ is subsequently set by a power controller 11 at the compressor 8.

In order to prevent the drive unit 17 from requesting more power from the fuel cell 1 than the latter can instantaneously supply, the drive unit 17 is not supplied with the power request $p_{set}$ determined in block 20 from the accelerator pedal position FP but rather with a corrected power value $p_{corr}$. This corrected set value for the power $p_{corr}$ is determined in the blocks 28, 29. Specifically, in block 28 the actual power $p_{max}$ which the fuel cell 1 can emit with this air flow rate $\dot{m}_{act}$ is determined from the actually measured air flow rate $\dot{m}_{act}$ with reference to a characteristic curve. The characteristic curve diagram is selected so that the actual power $p_{max}$ lies below the maximum power of the fuel cell $p_{BZ}$ to an extent which reliably prevents collapse of the fuel cell 1. Accordingly, in block 29, the electrical power $p_T$ which can be actually supplied is determined from the temperature T of the fuel cell 1 with the aid of a characteristic curve diagram. The powers $p_{max}$ and $p_T$ which can be actually supplied and which are determined in the blocks 28 and 29 are compared with one another and the lower value is fed to the drive unit 17 as a corrected set value $P_{corr}$ for the power.

The method of the present invention operates, therefore, primarily such that the electrical power required for the drive power $p_{set}$ requested by the driver is always just produced in the fuel cell 1. The power $p_{BZ}$ of the fuel cell 1 is achieved by controlling the rotational speed $\underline{n}$ of the compressor 8, and thus of the air flow rate $\dot{m}_{act}$.

In addition, however, two safety measures are also built into the method. First, by limiting the requested power $p_{set}$ in block 21, the fuel cell 1 is prevented from producing more electrical power than the drive unit 17 can instantaneously absorb. For example, in the event of overheating, overspeeding or the occurrence of other functional faults, the drive unit 17 transmits appropriate error signals to the block 21.

Second, the correction of the requested power in block 28, 29 prevents the drive unit 17 from demanding more power than the fuel cell 1 can instantaneously supply. In order to prevent the fuel cell 1 from collapsing, if necessary a reduced power request $p_{corr}$ is therefore simulated to the drive unit 17. This occurs chiefly when the accelerator pedal is suddenly depressed. In this situation, the fuel cell 1 cannot immediately supply as much electrical power as the drive unit 17 would require to provide the demanded drive power $P_{set}$. In the remaining time until the fuel cell 1 can supply the requested power $p_{set}$, a driver's request $p_{corr}$ which corresponds to the maximum power $p_{max}$ which can be supplied instantaneously is simulated to the drive unit 17. The drive unit 17 is thus always approximated to the power $p_{set}$ actually requested by the driver in accordance with the maximum electrical power $p_{max}$ which can be supplied.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. A method for dynamic power control of a vehicle electric drive unit, comprising the steps of, setting power produced by the fuel cell by continuously controlling oxidant flow rate to the fuel cell, and feeding all generated current made available by the fuel cell to the electrical drive unit, except for current required for accessories, so as to supply the electrical power via only the fuel cell.

2. The method according to claim 1, wherein a set power value is determined from an accelerator pedal position, the oxidant flow rate which the fuel cell requires to produce the set power value is determined and fed to a comparison point of a control circuit as a set value, an instantaneously oxidant flow rate is determined and is fed to the comparison point as an actual value, and a differential air flow rate is determined at the comparison point so as to be controlled toward zero.

3. The method according to claim 2, wherein the step of controlling oxidant flow rate is effected by controlling the rotational speed of a compressor arranged in an oxidant feed line to the fuel cell.

4. The method according to claim 1, wherein ambient air constitutes an oxidant supplied to the fuel cell via an oxidant feed line.

5. The method according to claim 1, wherein the set power value is a function of operating parameters.

6. The method according to claim 1, wherein a corrected set power value determinable from the actual oxidant flow rate value is supplied to the drive unit.

7. The method according to claim 6, wherein the corrected set power value is determinable as a function of operating parameters.

8. An apparatus for dynamic power control of a vehicle electric drive unit, comprising means for setting power produced by the fuel cell by continuously controlling oxidant flow rate to the fuel cell and feeding all generated current made available by the fuel cell, except for current required by accessories, as the sole power supply to the electrical drive unit, a first feed line for feeding fuel to the fuel cell, a second feed line for feeding ambient air to the fuel cell, and a compressor with an adjustable rotational speed arranged in the second feed line.

9. The apparatus according to claim 8, wherein means is provided for determining a set power value from an accelerator pedal position, the oxidant flow rate which the fuel cell requires to produce the set power value is determined and fed to a comparison point of a control circuit as a set value, an instantaneously oxidant flow rate is determined and is fed to the comparison point as an actual value, and a differential air flow rate is determined at the comparison point so as to be controlled toward zero.

10. The apparatus according to claim 9, wherein means is provided for controlling the oxidant flow rate via rotational speed of a compressor arranged in an oxidant feed line to the fuel cell.

11. The apparatus according to claim 10, wherein means is provided for limiting the set power value as a function of vehicle operating parameters.

12. The apparatus according to claim 11, wherein means is provided for determining a corrected set power value from the actual oxidant flow rate value as a function of vehicle operating parameters and supplying the corrected set power value to the drive unit.

* * * * *